US006707028B2

(12) United States Patent
Housh et al.

(10) Patent No.: US 6,707,028 B2
(45) Date of Patent: Mar. 16, 2004

(54) ROTATING LIGHT SOURCE SYSTEM FOR DETECTING AN OBSTRUCTION IN A SPACE, FOR USE IN A MOBILE STORAGE SYSTEM (75) Inventors: Robert A. Housh, East Troy, WI (US); Steven M. Lehmann, Fort Atkinson, WI (US); William B. McHenry, Fort Atkinson, WI (US); Larry A. Gunseor, New Glarus, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 179 days.

(21) Appl. No.: 09/783,700

(22) Filed: Feb. 14, 2001

(65) Prior Publication Data

US 2002/0109078 A1 Aug. 15, 2002

(51) Int. Cl.[7] .................................. H01J 40/14
(52) U.S. Cl. ..................... 250/222.1; 250/221; 340/556
(58) Field of Search .................. 250/222.1, 559.29, 250/224, 559.12, 221; 350/555, 556

(56) References Cited

U.S. PATENT DOCUMENTS

| 4,693,184 A | 9/1987 | Peterman |
| 4,745,516 A | 5/1988 | Griffin |
| 4,759,592 A | 7/1988 | Dahnert |
| 5,359,191 A | 10/1994 | Griesemer et al. |
| 5,417,487 A | 5/1995 | Dahnert |
| 5,427,444 A | 6/1995 | Griesemer |
| 5,569,910 A | 10/1996 | Griesemer |

Primary Examiner—David V. Bruce
Assistant Examiner—Hoon Song
(74) Attorney, Agent, or Firm—Boyle, Fredrickson, Newhelm, Stein & Gratz, S.C.

(57) ABSTRACT

An object detection system for use in detecting the presence of an object within a space, such as in an aisle of a mobile storage system bounded by at least one mobile storage unit, includes a pair of pivotable light emitter/receiver unit located outwardly of each side of the space and a series of reflectors located outwardly of each side of the space. Each emitter/receiver unit includes a pivotable emitter which emits a beam of light which passes across and through the space and impinges upon the reflectors located outwardly of the opposite side of the space. A receiver associated with each emitter/receiver unit receives reflected light from the reflectors. The presence of an object within the space prevents the light beam from reaching one or more of the reflectors, and the absence of one or more reflected light beams is detected such that operation of the mobile storage unit is prevented until the object exits or is removed from the space.

41 Claims, 10 Drawing Sheets

ROTATING LIGHT SOURCE SYSTEM FOR DETECTING AN OBSTRUCTION IN A SPACE, FOR USE IN A MOBILE STORAGE SYSTEM

BACKGROUND AND SUMMARY OF THE INVENTION

This invention relates to a system for detecting the presence of an object within a space, and more particularly to an object detection system for use in connection with a mobile storage system.

Mobile storage systems typically include a series of mobile storage units mounted to rails or the like and movable toward and away from each other in response to operation of a drive arrangement associated with each mobile storage unit. A mobile storage system typically includes stationary end units with a series of movable storage units located between the end units. Movement of the mobile storage units functions to create an access aisle between two of the units. As the aisle opens, the other storage units are positioned in close side-by-side relationship to minimize the overall floor space required for the storage units.

In the past, it has been known to provide a sweep or safety switch bar for notifying the control system associated with the drive arrangement of each storage unit to stop motion of the storage unit if an obstacle or impediment to movement is encountered. This type of arrangement is illustrated in U.S. Pat. Nos. 4,743,078 and 4,733,923, the disclosures of which are hereby incorporated by reference. This type of system prevents the storage units from closing, but typically involves the storage units moving close together before an obstacle is encountered. A photoelectric sweep is disclosed in U.S. Pat. No. 5,121,975, the disclosure of which is hereby incorporated by reference. This type of system provides an alternative arrangement, but still results in movement of the storage unit quite close to a person before movement of the storage unit is interrupted.

U.S. Pat. No. 5,427,444, also incorporated by reference, shows a directional detector for use with a mobile storage system, which detects entry of an obstacle into the aisle and prevents movement until the obstacle is detected to have left the aisle. While this type of system is satisfactory, it involves use of a number of stationarily mounted light source-light detector pairs mounted at various locations along the length of each of a pair of adjacent storage units. U.S. Pat. No. 5,417,487 shows use of a motion detector for indicating the presence of a person between storage units, for preventing movement of the storage units when a person is present in the aisle.

It is an object of the present invention to provide an improved system for detecting the presence of an object in an aisle or space, particularly in connection with a mobile storage system. Another object of the invention is to provide such a system which provides high resolution, i.e. the ability to detect relatively small objects located within the aisle. A still further object of the invention is to provide such a system which can be used in connection with mobile storage units of varying length, and which provides the same degree of accuracy, reliability and resolution for any length of storage unit. A still further object of the invention is to provide such a system which is relatively simple in its components and installation, and requires little modification to the storage units.

In accordance with the invention, an object detection system for use in detecting the presence of an object within a space, such as within an aisle located adjacent a mobile storage unit in a mobile storage system, includes a light source which emits a light beam, and which is movable so as to move the light beam across the space. The light source is positioned toward a first side of the space and emits the light beam in a direction toward the second side of the space. The space further defines a first end and a second end, and the light source is positioned toward one of the ends of the space. A second light source is positioned toward the other end of the space, and is positioned so as to move a light beam across the space in a direction opposite that of the first light source. The first and second light sources are preferably pivotable so as to move the light beams across the space in a fan-type or sweeping motion.

The invention further includes a receiver or detector located toward each side of the space. In a preferred form, a series of reflectors are also positioned toward each side of the space. The reflectors function to reflect each light beam toward the side of the space from which the light beam is emitted, and each receiver receives the reflected light beams as light pulses. The presence of an object within the space functions to obstruct passage of the light beam from one of the emitters toward at least one of the reflectors, such that a light beam is not reflected back toward the receiver on the side of the space from which the light beam is emitted. This obstruction in the passage of the light beam provides a signal indicative of the presence of an object within the space, and a control system interconnected with the light beam receiver functions to prevent movement of the mobile storage unit in response to the signal when an object is present within the space.

In one form, each receiver is mounted adjacent one of the emitters in an emitter/receiver combination unit, to detect the reflected light pulses in generally the same location from which the light beam is emitted. Each emitter/receiver unit is preferably located within a housing, and is pivotably movable in response to operation of a motor located within the housing.

The emitter/receiver units may be mounted to adjacent storage units located one on either side of the space, with a series of reflectors being mounted to the mobile storage unit opposite each emitter/receiver unit. Alternatively, the emitter/receiver units and reflectors may be mounted in other locations, such as to stationary cabinets or walls, and may be mounted such that the light beams pass below the mobile storage units.

Each emitter/receiver unit may also include a secondary receiver arrangement, which directly receives the light beam emitted by the opposite emitter/receiver unit. Each secondary receiver arrangement is interconnected in the control system for the opposite emitter/receiver unit, and controls operation of the emitter portion of the opposite emitter/receiver unit to operate the emitter only when it is directed across the space.

The invention further contemplates an improvement in a mobile storage system as well as a method of detecting the presence of an object within a space, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
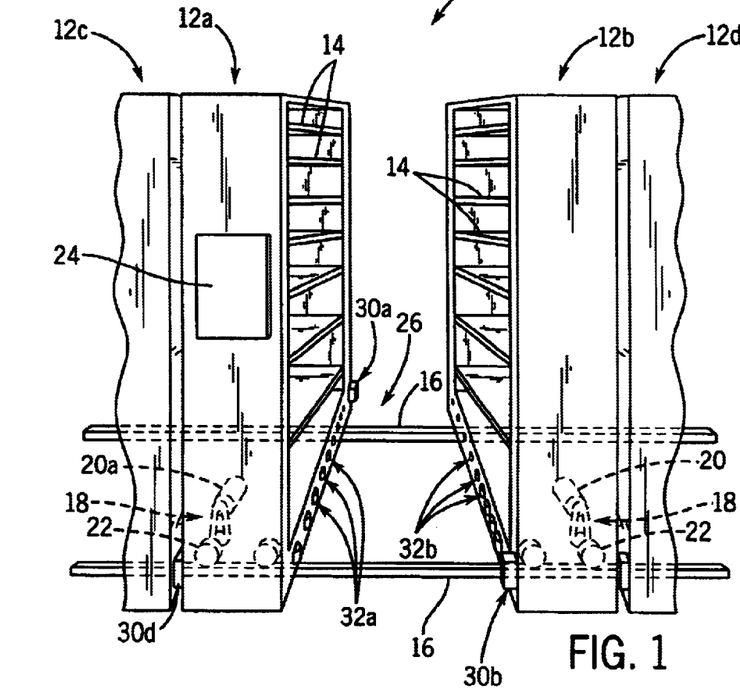
FIG. 1 illustrates a portion of a mobile storage system incorporating the object detection system of the present invention.

FIG. 1 illustrates a mobile storage system 10 which includes a series of mobile storage units, such as shown at 12a, 12b, 12c and 12d, each of which includes a series of shelves 14. Storage units 12a–12d comprise a portion of a number of similarly configured storage units incorporated in mobile storage system 10. Each storage unit 12a–12d is movable along a set of rails 16 by a prime mover 18, such as an electric motor 20 connected to a drive wheel 22 which runs along at least one of the rails 16. Each storage unit 12a–12d includes a control unit 24 for controlling operation of motor 20 and for determining the direction of movement of motor 20 and drive wheel 22. In a manner as is known, a scissors-type pantograph (not shown) extends between adjacent storage units 12 for routing power and communication cables along mobile storage system 10. The general construction and operation of this type of mobile storage system is known in the art, and is available from Spacesaver Corporation of Fort Atkinson, Wis.

FIG. 1 illustrates an intermediate portion of mobile storage system 10, i.e. at a location between a pair of storage units 12a, 12b which are movable on rails 16. At each end of mobile storage system 10, a stationary storage unit may be provided or the endmost movable storage unit 12 may be located adjacent a wall or other stationary structure. When at least one of the mobile storage units 12 is moved apart from the adjacent mobile storage unit 12, as shown in FIG. 1 with respect to mobile storage units 12a, 12b, or is moved away from a stationary storage unit, wall or other stationary structure, a space, shown generally at 26, is formed therebetween. Space 26 defines an aisle between the adjacent mobile storage units such as 12a, 12b, or between a mobile storage unit 12 and a stationary structure, to provide access to the contents of mobile storage unit 12 contained on shelves 14. When space 26 is present and is bounded by at least one mobile storage unit 12, an object detection system according to the invention is employed so as to ensure there are no obstructions in the path of movement of mobile storage unit 12 before commencing operation of motor 20 associated therewith so as to move a mobile storage unit 12 and close space 26.

In accordance with the present invention, an object detection system includes a scanner or combination emitter/receiver unit 30a mounted toward one end of mobile storage unit 12a, and a similar scanner or combination emitter/receiver unit 30b mounted toward the end of mobile storage unit 12b opposite scanner unit 30a. In this manner, scanner units 30a, 30b are located at opposite ends of space 26. A series of spaced reflectors 32a extend along the base of mobile storage unit 12a away from scanner unit 30a toward the opposite end of mobile storage unit 12a. Similarly, a series of spaced reflectors 32b extend along the base of mobile storage unit 12b in a direction away from scanner unit 30b and toward the opposite end of mobile storage unit 12b.

Figure 3:
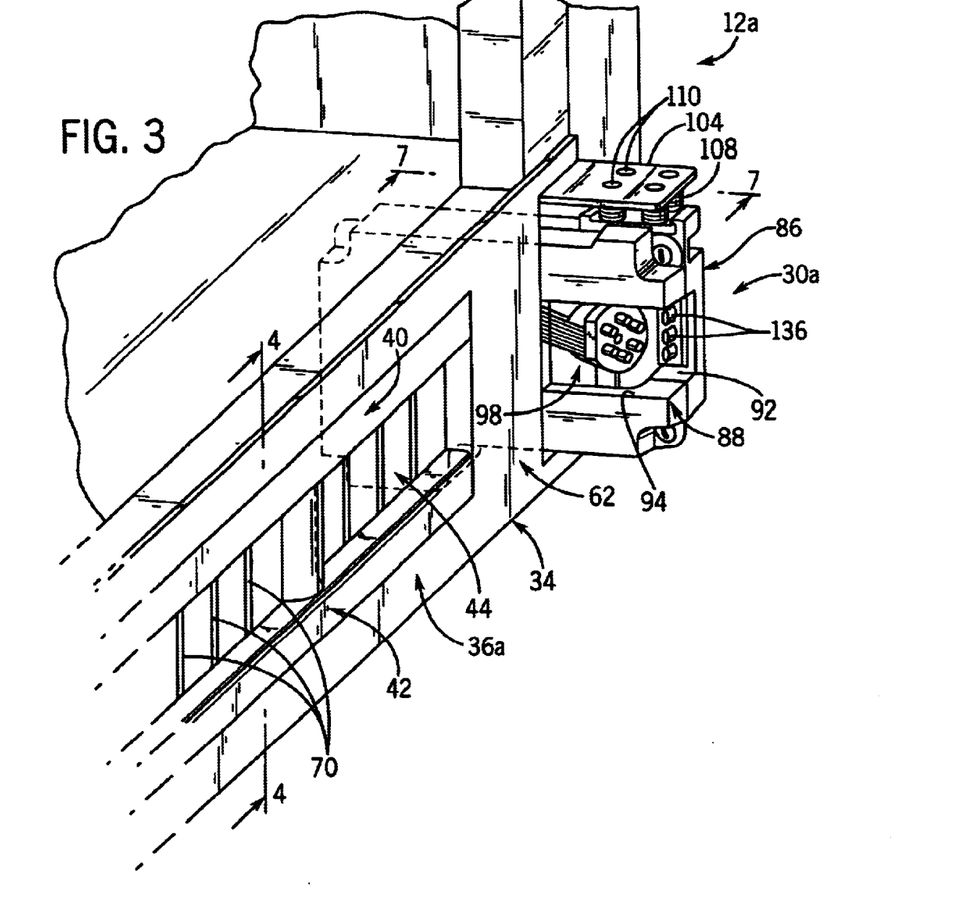
FIG. 3 is a partial isometric view illustrating one of the emitter/receiver units and a portion of the reflector arrangement forming a part of the object detection system of FIGS. 1 and 2.

FIG. 3 illustrates scanner unit 30a secured to the base or carriage 34a of mobile storage unit 12a, as well as a reflector arrangement 36a provided on carriage 34a which incorporates reflectors 32a. Scanner unit 30b and reflector arrangement 36b of mobile storage unit 12b are of the same construction as scanner unit 30a and reflector arrangement 36a, and it is understood that the description of scanner unit 30a and reflector arrangement 36a applies equally to scanner unit 30b and reflector arrangement 36b.

Figure 4:
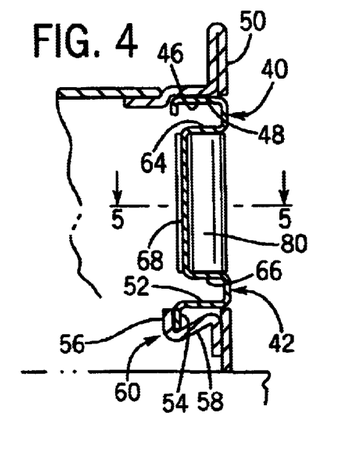
FIG. 4 is a partial section view taken along line 4—4 of FIG. 3.
Figure 5:
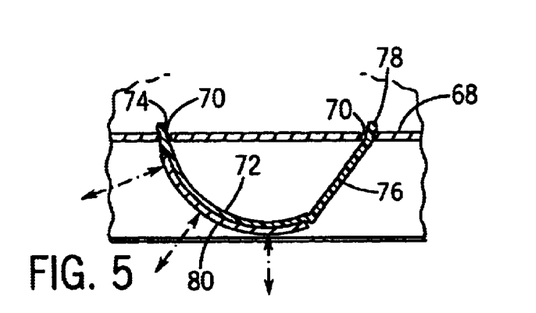
FIG. 5 is a partial section view taken along line 5—5 of FIG. 4.

Referring to FIGS. 3–5, reflector arrangement 36a includes a reflector mounting strip 38 having an upper C-shaped section 40 and a lower C-shaped section 42, between which a channel 44 is located. Upper C-shaped section 40 includes a top flange 46 which is engageable with a downwardly facing surface 48 defined by a carriage panel member 50. Similarly, lower C-shaped section 42 includes a lower flange 52 having a lip 54 received within an upwardly facing groove defined by a pair of legs 56, 58 of a carriage frame member 60. Reflector mounting strip 38 is received within an opening formed in the front panel of carriage 34, shown generally at 62 in FIG. 3.

Channel 44 of reflector mounting strip 38 is defined by a lower web 64 of upper C-shaped section 40, an upper web 66 of lower C-shaped section 42, and a vertical wall 68 extending therebetween. Reflectors 32a are adapted to be engaged within channel 44.

As shown in FIG. 5, vertical wall 68 of channel 44 is formed with a series of equally spaced apart vertical slots 70. Each reflector 32a includes an arcuate outwardly facing wall 72 terminating in an end 74, in combination with an angled wall 76 extending from the outer end of arcuate wall 72, and terminating in an end 78. Ends 74, 78 are normally spaced apart a distance slightly greater than the distance between adjacent slots 70. In this manner, each reflector 32 is capable of being snapped into adjacent slots 70 within channel 44, by moving wall ends 74, 78 slightly together to enable wall ends 74, 78 to be inserted through slots 70. In this manner, each reflector 32 can be positioned in a desired location along the length of reflector mounting strip 38 as desired, for reasons to be explained.

Arcuate outwardly facing wall 72 of each reflector 32a defines an arcuate outwardly facing recess within which a strip of highly reflective material 80 is received, throughout the length of each reflector 32a. Reflective material strip 80 may be any satisfactory highly reflective material as is known in the art, typically provided with an adhesive backing, such as is available from Reflexite of New Britain, Conn. under its Model No. D95-1542-020150, although it is understood that other similar types of reflective material may be employed.

Referring to FIGS. 3 and 6–8, scanner unit 30a includes a clamshell-type housing 84 formed of a base section 86 and a cover section 88. Housing 84 defines an internal cavity 90. Base section 84 and cover section 86 include aligned windows 92, 94, respectively, which communicate with internal cavity 90 of housing 84.

Figures 6, 7:
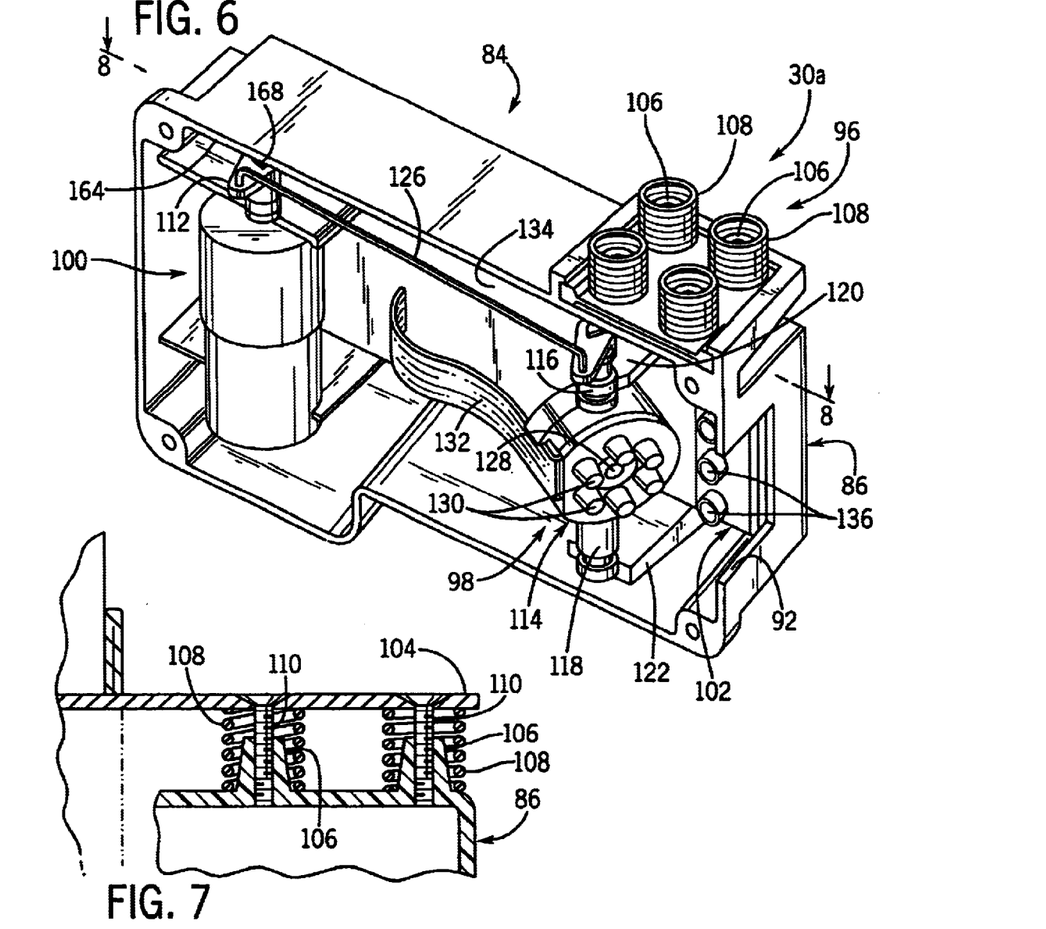
FIG. 6 is a partial isometric view showing the internal components of the emitter/receiver unit illustrated in FIG. 3.
FIG. 7 is a partial section view taken along line 7—7 of FIG. 3.
Figure 8:
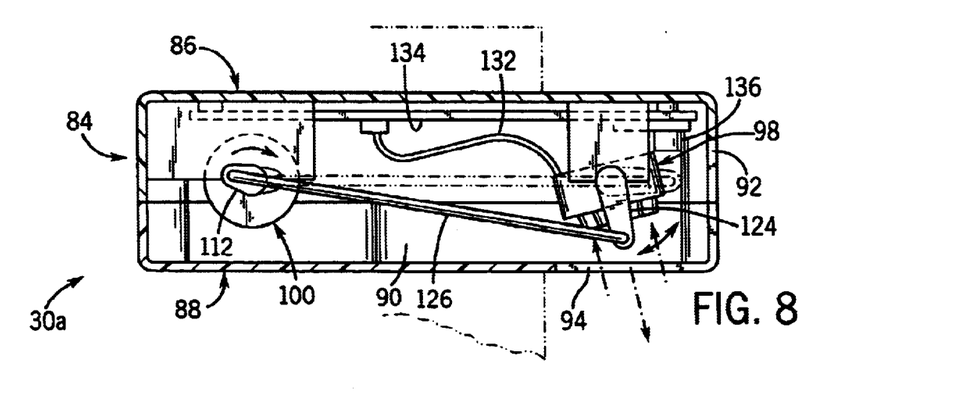
FIG. 8 is a section view taken along line 8—8 of FIG. 6.

Housing 84 is adapted to be mounted to carriage 34 via a mounting arrangement 96, in a manner to be explained. Generally, housing 84 encloses the operating components of the object detection system of the present invention, namely a pivotable emitter/receiver 98, a motor 100, and a secondary receiver 102.

As shown in FIG. 7, mounting arrangement 96 of housing 84 is adapted for engagement with a mounting plate 104 which extends outwardly from the front panel of carriage 34. A series of mounting bosses 106 extend upwardly from the top wall of housing base section 86. Each mounting boss 106 is located in the interior of a relatively heavy coil-type compression spring 108, and springs 108 bear between the top wall of housing base section 86 and the underside of mounting plate 104. A series of threaded fasteners, such as screws 110, extend through openings in mounting plate 104 and into engagement with a threaded passage formed in each mounting boss 106. In this manner, housing 84 is suspended from mounting plate 104, and screws 110 can be turned so as to adjust the attitude of housing 84, for reasons to be explained.

Motor 100 is stationarily mounted within internal cavity 98 of housing 84, in any satisfactory manner. Motor 100 may be a conventional DC gear-type motor such as is available from Hankscraft Motors, Inc. (Manufacturer) of Reedsburg, Wis.(City, State) under its Model No. GA34097, although it is understood that any other satisfactory type of motor may be used. Motor 100 includes a rotatable output shaft to which a drive arm 112 is mounted, and which is rotatable in response to rotation of the motor output shaft.

Emitter/receiver 98 is in the form of a laser-type emitter/receiver including a drum-type body 114. An upper pivot shaft 116 extends upwardly from body 114, and a lower pivot shaft 118 extends downwardly from body 114. Pivot shafts 116, 118 are coaxial with each other, and are oriented substantially vertically. Pivot shafts 116, 118 are received within mating upper and lower mounting areas defined by housing base sections 86 and 88, such as shown at 120, 122, respectively. With this mounting arrangement, emitter/receiver body 114 is pivotably movable within internal cavity 90 of housing 84. A driven arm 124 is mounted to the upper end of upper pivot shaft 116, and is interconnected with drive arm 112 of motor 100 through a drive link 126. In this manner, operation of motor 100 to rotate the output shaft of motor 100 results in pivoting or rotating movement of emitter/receiver 98 about a generally vertical pivot axis defined by pivot shafts 116, 118.

A laser emitter aperture 128 is formed in the outer face of emitter/receiver body 114, to provide emission of a laser-type light beam through aperture 128. A series of radially spaced transparent light receivers 130 are positioned on the outer face of body 114 about emitter aperture 128. A ribbon-type cable 132 extends from emitter/receiver 98 to a scanner circuit board 134 located within internal cavity 90 of housing 84.

Emitter/receiver includes a light beam generator which emits a Class IIIa type of laser beam through aperture 128, which is capable of traveling long distances with little distortion. Receivers 130 are of conventional light-receptive or light-sensing construction for receiving light from a source and providing an output signal in response thereto. Representatively, emitter/receiver 98 may be such as is available from Panasonic Industrial Company of Elgin, Ill. under its Model No. PNA140/L.

Secondary receiver 102 is mounted to housing base section 86 at the inner end of window 92. Secondary receiver 102 is fixed in position, and includes a series of vertically aligned light receivers 136 which, like light receivers 130, function to detect the presence of light and output a signal in response thereto. Light receivers 136 are interconnected with scanner circuit board 134.

At the time of installation of housing 84, screws 110 are engaged with mounting bosses 106 as shown in FIG. 7 and are driven so as to compress springs 108. Screws 110 are then adjusted so as to level housing 84, to ensure that the pivot axis defined by pivot shafts 116, 118 is vertical. In this manner, when a light beam is emitted from laser emitter aperture 128, the emitted beam travels across and through space 26 in a horizontal plane.

Figure 9A:
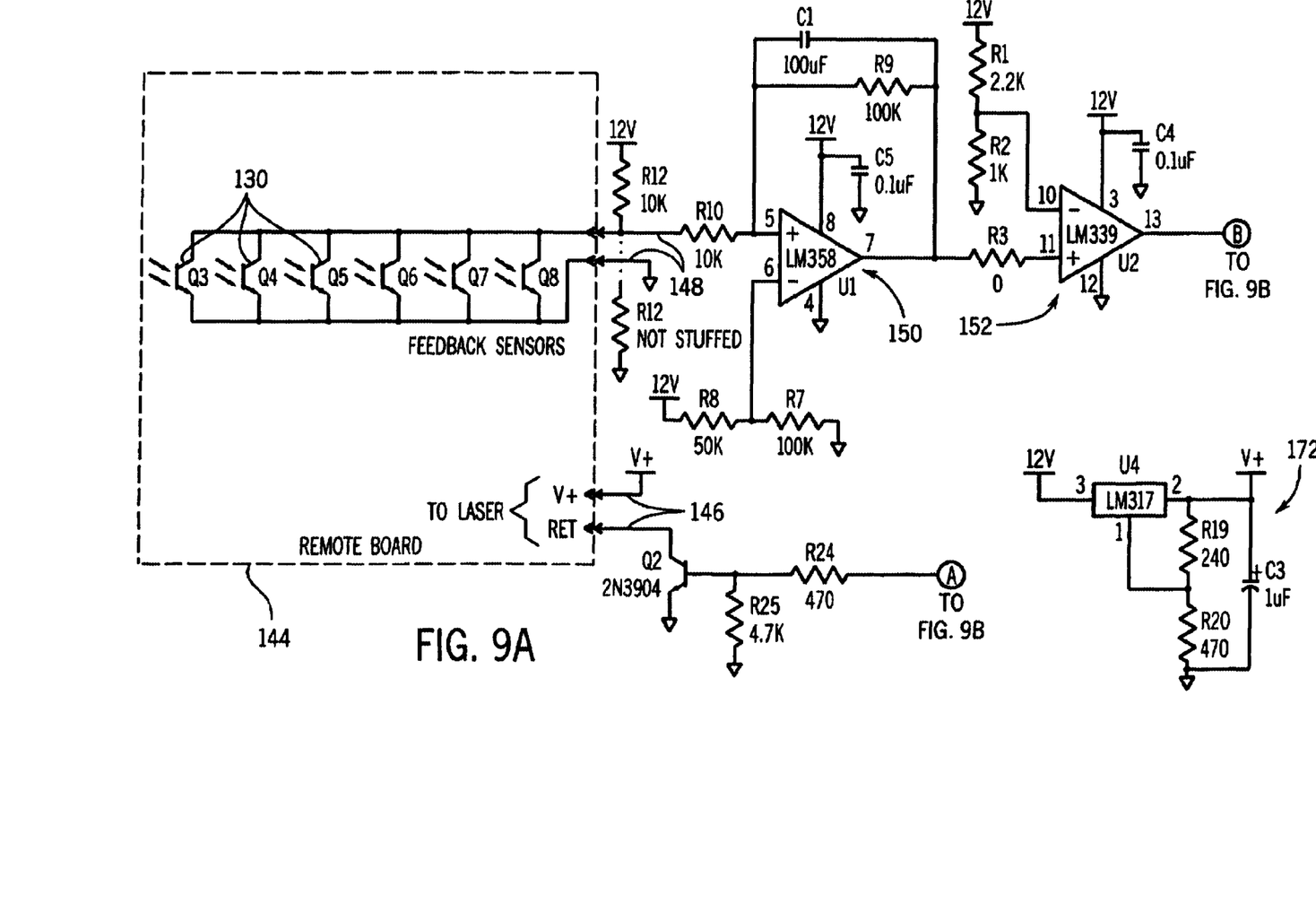
FIG. 9 is a schematic view of the components incorporated in each emitter/receiver unit as shown in FIG. 6.
Figure 9B:
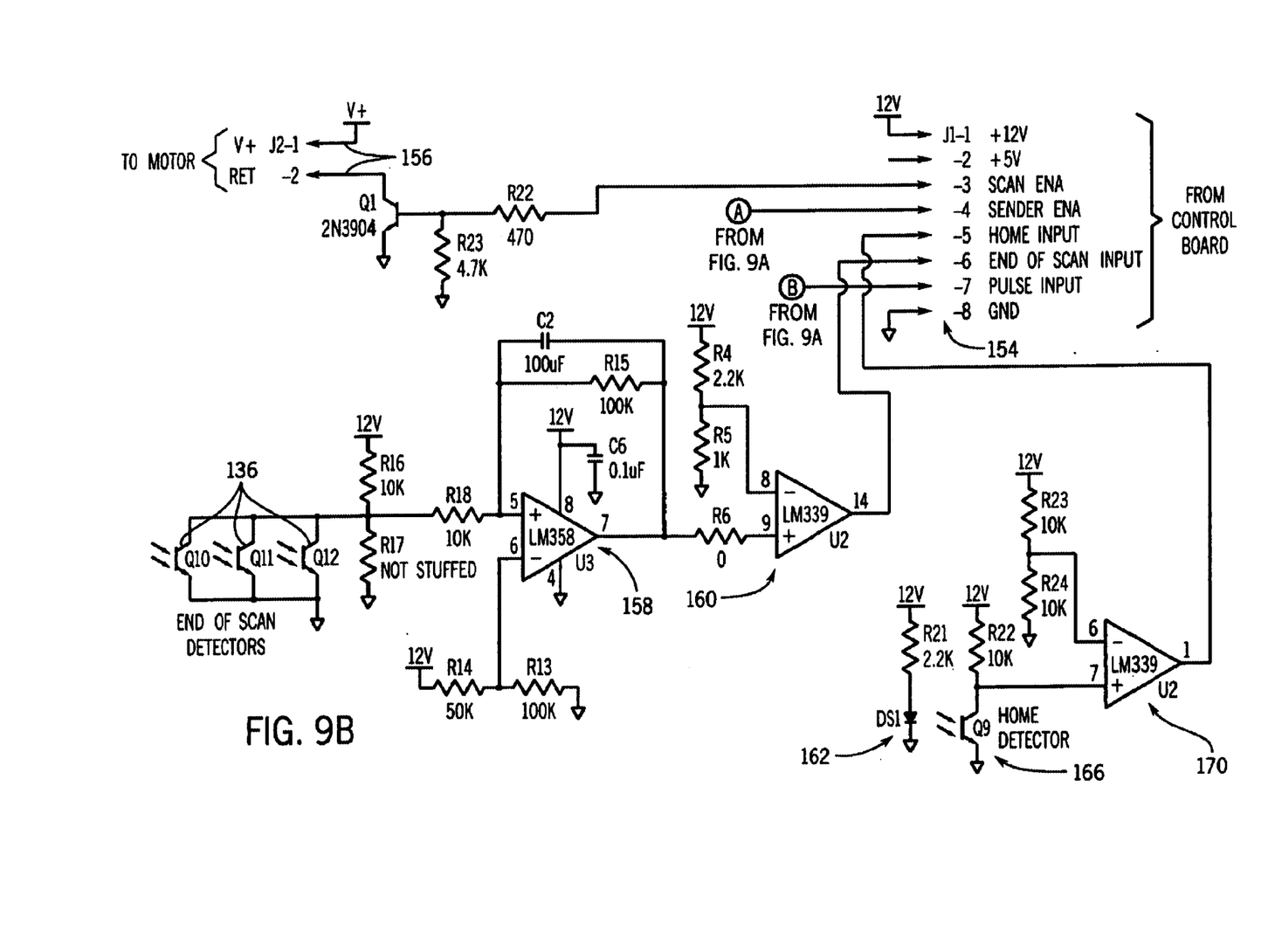
Figure 10A:
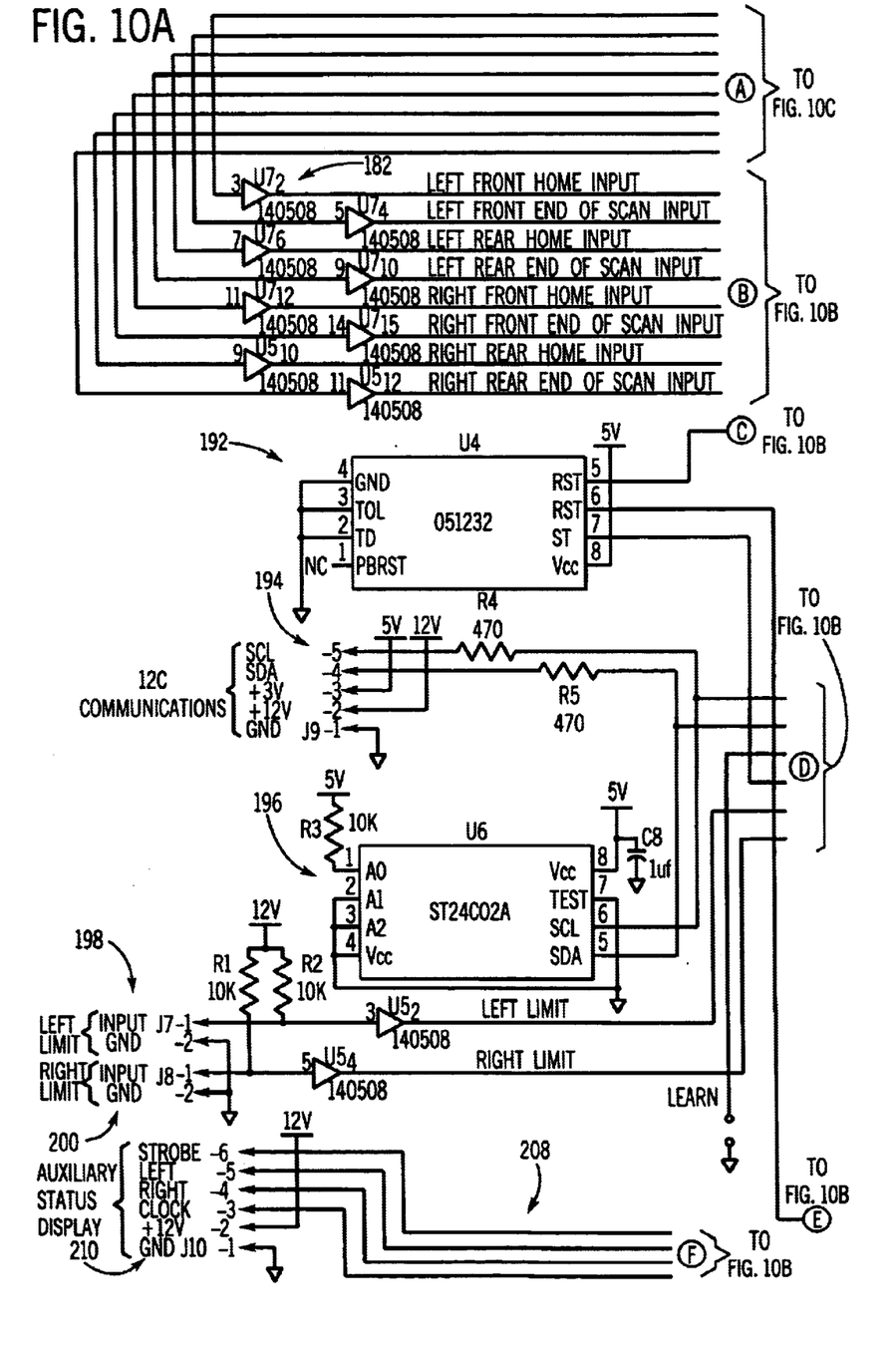
FIG. 10 is a schematic diagram of the control system which interfaces with the emitter/receiver units, such as shown in FIG. 6, and the drive arrangements of the mobile storage units incorporated in the mobile storage system of FIG. 1.
Figure 10B:
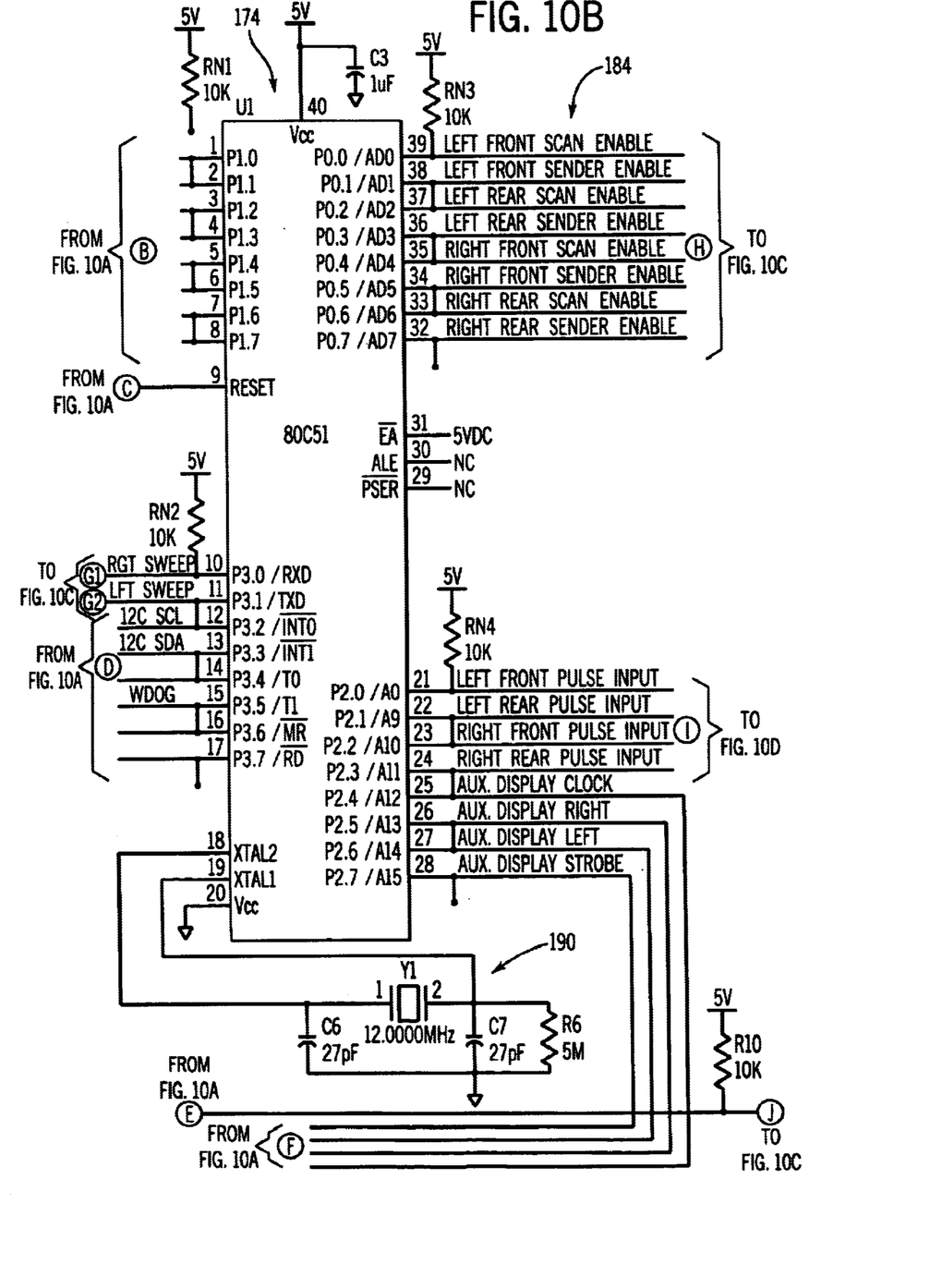
Figure 10C:
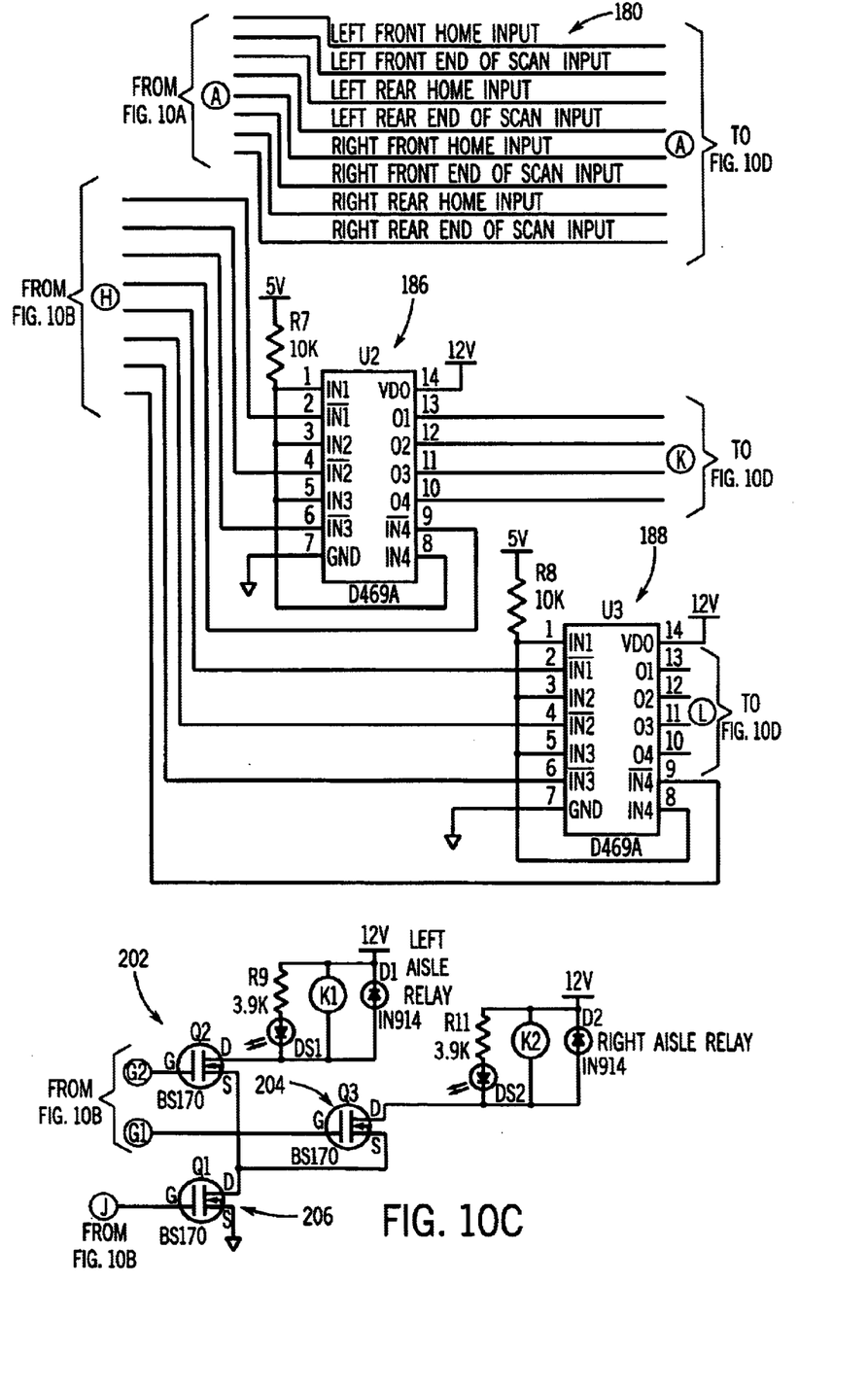
Figure 10D:
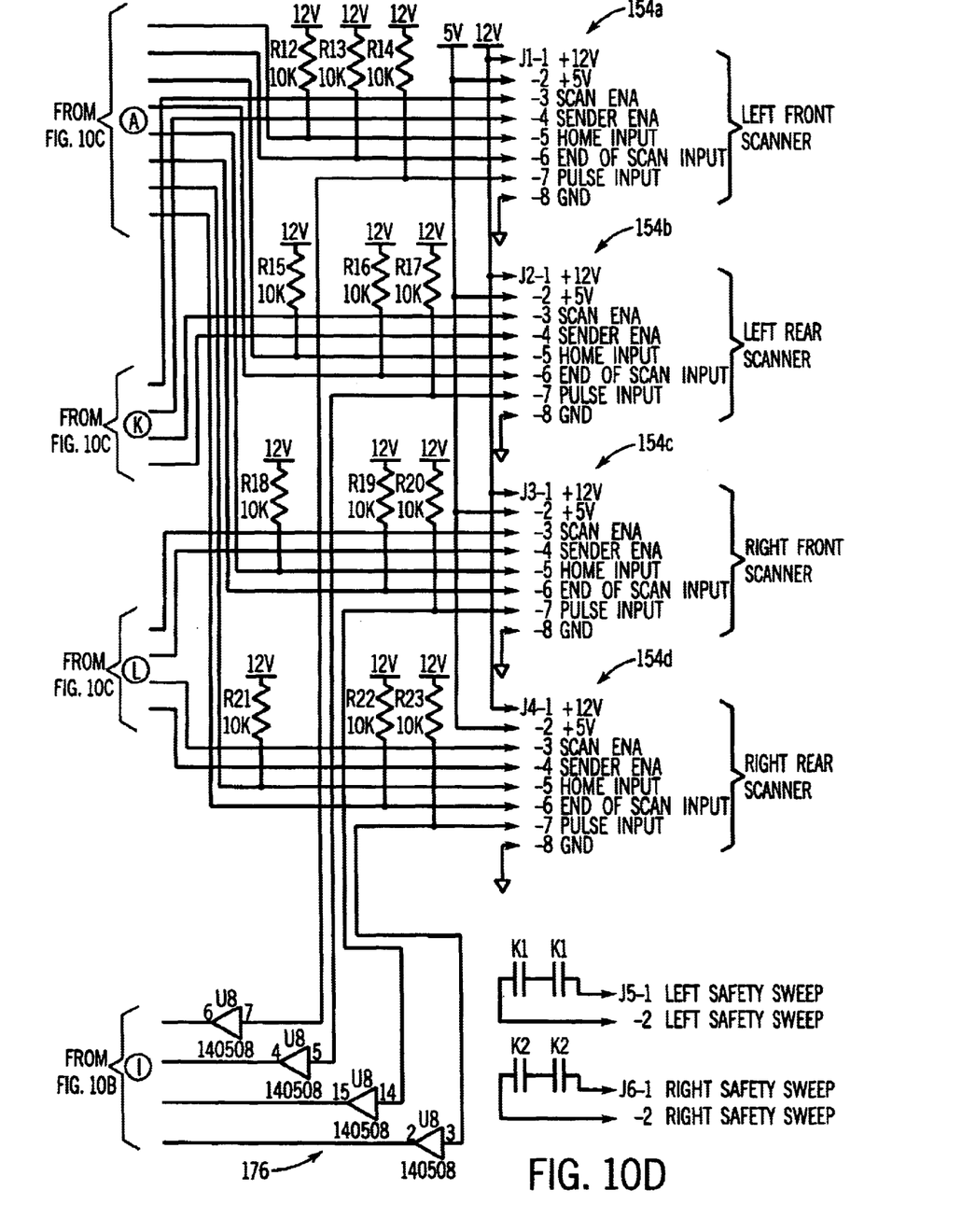

FIG. 9 illustrates the components contained on scanner circuit board 134 located within internal cavity 90 of housing 84. A remote board 144 is contained within the interior of emitter/receiver body 114. Receivers 130 are mounted to remote board 144, and are in the form of conventional light-sensitive transistors. The laser emitter is also mounted to remote board 144, and receives power through a pair of conductors 146 contained within ribbon cable 132. Output signals from receivers 130 are supplied to conductors 128 contained within ribbon cable 132, and are supplied through a gain stage amplifier 150 and a buffer gate 152 to a connector 154. Power is supplied to motor 100 through conductors 156, which are interconnected with connector 154 in the same manner as laser power supply conductors 146. Secondary receivers 136 supply input signals through a gain stage amplifier 158 and a buffer 160 to connector 154.

An infrared LED light source 162 is mounted to the inside surface of the upper wall of housing base section 86, shown at 164 in FIG. 6. A sensor 166 is located adjacent LED light source 162, also on the inside surface of housing upper wall 164. A reflective strip 168 (FIG. 6) is applied to the upwardly facing surface of drive arm 112. With this arrangement, light emanating from LED light source 162 is reflected by reflective strip 168 and is received by sensor 166, to provide an input signal through a buffer 170 to connector 154, which indicates that drive arm 112 is in a home position, wherein emitter/receiver body 114 is positioned so as to face straight across space 26.

FIG. 9 also illustrates a voltage regulator 172 which provides the power supply to motor 100 and to the laser of emitter/receiver 98.

FIG. 10 contains a schematic representation of the control system incorporated in the object detection system of the present invention and which interfaces with the mobile storage unit drive systems. The following is a general description of the components incorporated in the control system of FIG. 10, and details as to the particulars of the control system components are apparent to one skilled in the art.

Figure 2:
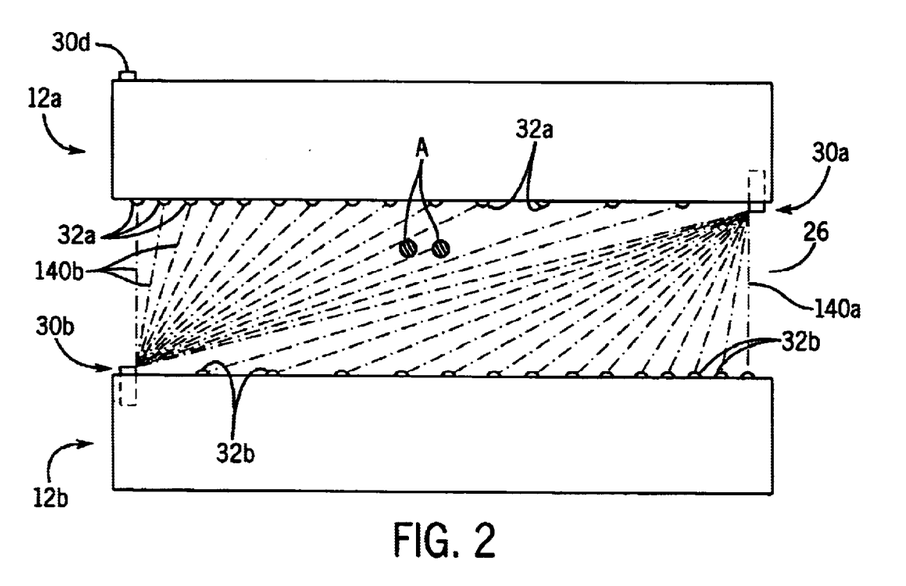
FIG. 2 is a top plan view of two mobile storage units forming a part of the mobile storage system of FIG. 1, and schematically illustrating operation of the emitter/receiver units for detecting the presence of an object within the space between the mobile storage units.

In FIG. 10, connector 154 of FIG. 9 is illustrated as connector 154a, which interfaces the control system of FIG. 10 with the components of scanner unit 30a. A similar connector 154b interfaces the control system with scanning unit 30b. Connectors 154c and 154d interface the control system of FIG. 10 with a pair of scanner units on the opposite side of one of the mobile storage units. With reference to FIGS. 1 and 2, a scanner unit 30c is mounted to mobile storage unit 12c at the far end of mobile storage unit 12c, in a location corresponding to that of scanner unit 30a on mobile storage unit 12a. A scanner unit 30d is mounted to the side of mobile storage unit 12a opposite scanner unit 30a and at the opposite end from scanner unit 30a. Scanner units 30c, 30d function in the same manner as scanner units 30a, 30b to enable leftward movement of mobile storage unit 12a when space 26 is located between mobile storage units 12a and 12c.

The control system of FIG. 10 includes a main processor 174, which may be a processor such as is available from Philips Semiconductor under its designation P87C51. Input signals from receivers 130 of each of scanner units 30a–30d are supplied to processor 174 through buffers 176 and a bus 178. Similarly, input signals from home sensors 166 and secondary or end of scan receivers 136 are supplied to processor 174 through a bus 180 and buffers 182. Output or enable signals are supplied from processor 174 through a bus 184 to high current drivers 186, 188 which are interconnected with motor 100 and the laser of emitter/receiver 98.

In a conventional manner, processor 174 is interconnected with a crystal clock oscillator 190 and a watchdog timer circuit 192.

Processor 174 interfaces with the mobile storage unit control board through a communication bus 194, and an onboard RAM 196 is interconnected with processor 174 and communication bus 196. Onboard RAM 196 is programmed so as to store the unique operating parameters and conditions for its associated mobile storage unit.

A pair of limit switches 198, 200 are mounted to the left and right pantographs, respectively, interconnected with the mobile storage unit. Limit switches 198, 200 provide an input signal to processor 174 as to the location of space 26, i.e. either on the left hand or the right hand side of the mobile storage unit.

An output of processor 174 is interconnected with a left aisle stopping relay 202 and a right aisle stopping relay 204. A global stopping relay 206 is interconnected with processor 174, to stop operation of the mobile storage unit in the event of a malfunction of processor 174.

A set of outputs are supplied through a bus 208 to a connector 210, for use in connection with a diagnostic tool to evaluate the functioning of processor 174.

In operation, the object detection system of the present invention functions as follows.

When one of mobile storage units 12, such as unit 12a, is actuated so as to initiate operation of motor 20 to move so as to close space 26, scanner units 30a, 30b are operated to ensure that there are no objects present between the mobile storage units 12 which are to be moved together, in this case mobile storage units 12a, 12b. For example, if mobile storage unit 12a is to be moved toward mobile storage unit 12b, scanner unit 30a and scanner unit 30b are operated before motor 20a of storage unit 12a commences operation. Scanner units 30a, 30b are operated sequentially. Representatively, scanner unit 30a is first operated as shown in FIG. 2. Scanner unit 30a first directs a light beam, shown at 140a, straight across space 26 toward the endmost reflector 32b. Motor 100 is then operated so as to impart rotation to emitter/receiver 98 of scanner unit 30a, to sweep light beam 140 across space 26. As illustrated, light beam 140d is directed toward the carriage of storage unit 12b, and clockwise rotation of emitter/receiver 98 continues such that light beam 140a impinges upon each subsequent reflector 32. Reflectors 32 function to reflect light beam 140a back toward scanner unit 30a, and the reflected light beam is detected by light beam receivers 130. Pivoting movement of emitter/receiver 98 of scanner unit 30a continues until light beam 140a strikes secondary receivers 136 of scanner unit 30b, which provides an end-of-travel indication for emitter/receiver 98 of scanner unit 30a. Reflectors 32b located on mobile storage unit 12b are spaced close together at the end of mobile storage unit 12b located toward scanner unit 30a, and the spacing of reflectors 32b increases in a direction toward the end of mobile storage unit 12b adjacent scanner unit 30b. The provision of slots 70 in reflector mounting strip 38 enable reflectors 32b to be positioned in various locations along the length of the carriage of mobile storage unit 12b, according to the desired resolution of the system. Representatively, reflectors 32b are positioned so as to provide a maximum three inch space between reflected pulses, to provide high resolution to the object detection system. However, for any given application, the spacing between reflectors 32b can be varied according to customer requirements or other parameters, to provide a desired degree of resolution. Further, with this mounting arrangement, the reflector locations can be moved to varying positions as desired to provide flexibility in installation and to accommodate variations in carriage length. Reflectors 32a mounted to mobile storage unit 12a are mounted and spaced apart in a similar manner.

Once emitter/receiver 98 of scanner unit 30a is pivoted to a position in which light beam 140a strikes secondary receivers 136 of scanner unit 30b, a signal from secondary receivers 136 is provided to emitter/receiver 98 of scanner unit 30a to cut off power to the laser of emitter/receiver 98. In this manner, light beam 140a does not travel past the end of mobile storage unit 12b. Operation of motor 100 of scanner unit 30a continues so as to continue pivoting emitter/receiver 98 of scanner unit 30a in a clockwise direction. Operation of motor 100 continues so as to continue rotation of drive arm 112, and the direction of movement of emitter/receiver 98 then commences a return sweep after being pivoted to a position in which the face of emitter/receiver body portion 114 is positioned perpendicular to the face of carriage 34. Power is restored to the laser of emitter/receiver 98 of scanner unit 30a after expiration of a predetermined time period which is set so as to commence operation of the laser of emitter/receiver 98 before light beam 140a reaches secondary receivers 136 during the return sweep of scanner unit 30a. The predetermined time period is established during an initial learn mode or calibration of the object detection system of the present invention, which occurs at the time of installation of mobile storage system 10. In response to operation of motor 100 of scanner unit 30a, light beam 140a traverses back across the face of carriage 34b to the home position, in which emitter/receiver 98 points straight across space 26 toward mobile storage unit 12b. During such return travel of light beam 140a, light beam 140a is detected by secondary receivers 136 and impinges upon reflectors 32b so as to provide light pulses back to receivers 130 of scanner unit 30a. In this manner, emitter/receiver 98 of scanner unit 30a functions to sweep space 26 when traveling in both directions through and across space 26. When the output shaft of motor 100 has been turned one full revolution, drive arm 112 is returned to its home position in which emitter/receiver 98 of scanner unit 30a points straight across space 26. When in its home position, a signal is provided to the control system through home sensor 166, to cut off operation of motor 100. Immediately thereafter, emitter/receiver 98 of scanner unit 30b is activated to direct light beam 140b toward carriage 34a of mobile storage unit 12a. Reflectors 32a carried by carriage 34a function to reflect light beam 140b back toward emitter/receiver 98 of scanner 30b, and the reflected light beams are received as pulses by light receivers 130 of scanner unit 30b. When light beam 140b reaches the opposite end of space 26, i.e. scanner unit 30a, light beam 140b impinges upon light receivers 136 of scanner unit 30a to provide an end-of-travel signal for the laser of emitter/receiver 98 of scanner unit 30b. In the same manner as described above, operation of motor 100 is continued to reverse the movement of emitter/receiver 98 of scanner unit 30b, such that light beam 140b traverse back along the face of carriage 34a to its home position.

At any point as light beams 140a, 140b traverse across space 26 between mobile storage units 12a, 12b, the presence of an object, such as shown at A (FIG. 2) functions to block the light beam so that the light beam does not reach one or more of reflectors 32 positioned opposite the side of space 26 from which the light beam is emitted. Accordingly, a light pulse is not reflected by the obstructed reflector 32, and the logic associated with the scanner unit recognizes the skipped pulse(s) and prevents operation of motor 20a through one of relays 202, 204. This nullifies the actuation signal provided to motor 20a, and requires the operator to initiate a subsequent actuation signal at which time emitter/receiver units 30a, 30b are again operated as described above to sense whether the object A is still present within space 26 between mobile storage units 12a, 12b. If all reflected light pulses are detected, the control system enables operation of motor 20a such that mobile storage unit 12a is moved toward mobile storage unit 12b so as to close space 26.

The drawings show emitter/receiver units 30a, 30b and reflectors 32 as being mounted to the movable components of mobile storage system 10. It should be understood, however, that at least one of emitter/receiver units 30a, 30b and its associated reflectors 32 may be mounted to a stationary storage unit or to a wall.

In addition, mobile storage units 12 of mobile storage system 10 may be constructed to provide a space below each mobile storage unit. Each emitter/detector unit, such as 30a, 30b and its associated reflectors 32, may be mounted to walls or other stationary objects located at either end of the mobile storage system, such that the light beams pass within the space below the storage units.

The light beams, such as 140a, 140b, may be of any frequency capable of being detected by a sensor, and may be either within the range of visible frequencies or may be in the infrared range so as to be invisible.

The invention has been shown and described with respect to reflectors 32 reflecting light beams back toward the side of the space from which the light beam emanates. It should be understood, however, that reflectors 32 may be replaced with receivers similar to secondary receivers 136, which do not reflect the light beam but rather directly receive the light beam and provide an output signal in response thereto. In addition, it should be understood that the end of travel secondary receivers 136 may also be replaced with a reflector which reflects the light beam back toward its source.

Figure 11:
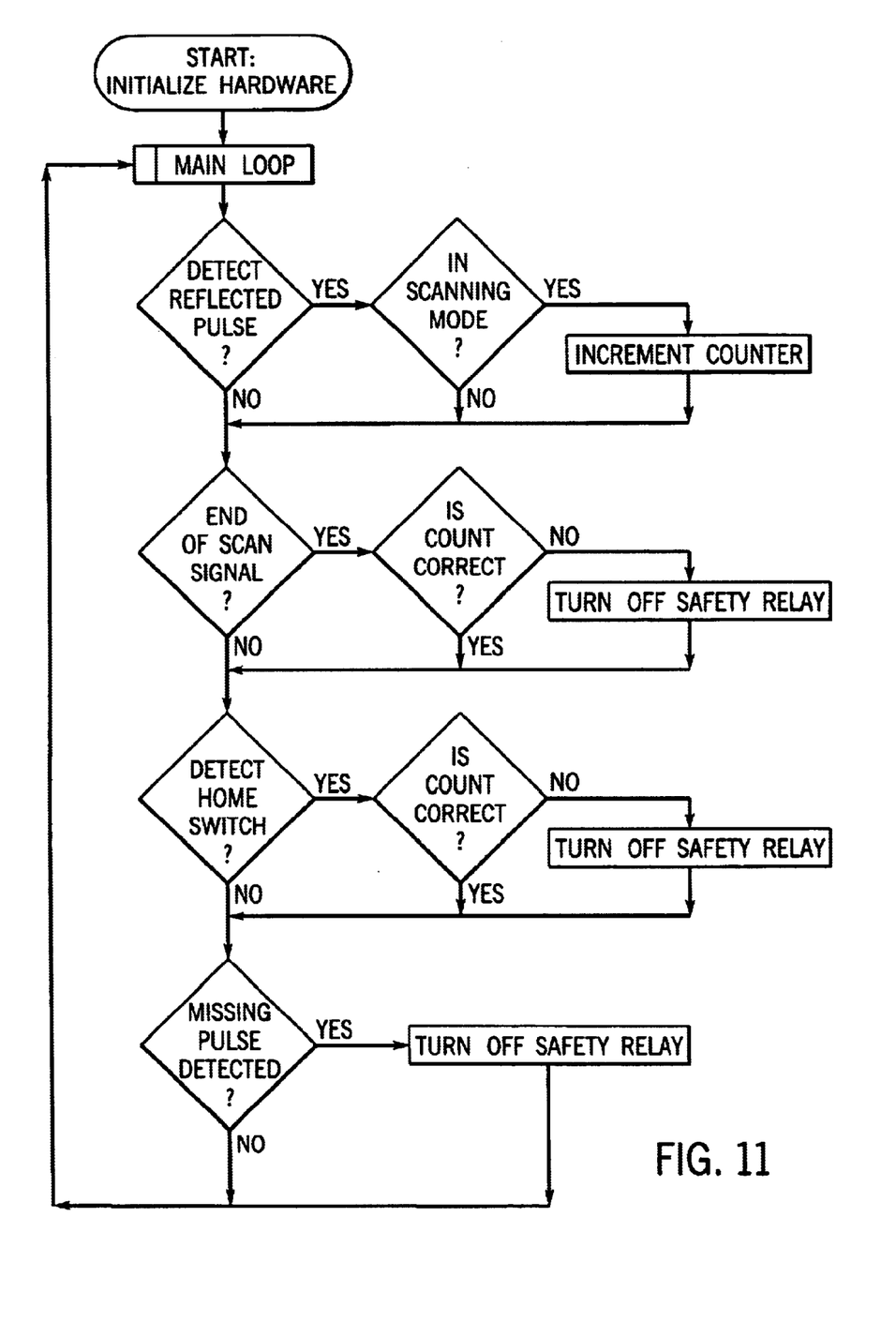
FIG. 11 is a flow chart illustrating the general steps involved in the operation of the object detection system of the present invention.

The software for controlling operation of the object detection system of the present invention is within the purview of one of ordinary skill in the art. FIG. 11 illustrates the general steps involved in software execution and the manner in which the object detection system of the present invention is controlled.

Various alternatives and embodiments are contemplated as being within the scope of the following claims particularly pointing out and distinctly claiming the subject matter regarded as the invention.

We claim:

1. A mobile storage system, comprising:
    at least one upright movable storage unit, wherein the storage unit defines one side of a space defining an open end, and wherein the movable storage unit includes a drive arrangement adapted to move the storage unit across the space;
    a pivotable light beam emitter located toward a first side of the space, wherein the light beam emitter is configured and arranged to pivot about a generally vertical pivot axis so that pivoting movement of the light beam emitter functions to move the light beam in a generally horizontal plane across the space toward a second side of the space;
    a reflector arrangement located toward the second side of the space opposite the light beam emitter, wherein the reflector arrangement reflects the light beam from the second side of the space toward the first side of the space; and
    a sensor located toward the first side of the space for sensing the light beam reflected by the reflector arrangement, wherein the presence of an object within the space functions to obstruct passage of the light beam through the space such that the light beam is prevented from reaching the sensor;
    wherein the light beam emitter is configured to pivot to a position at which the light beam impinges on the reflector arrangement adjacent the open end of the space without movement of the light beam into the open end of the space.

2. The object detection arrangement of claim 1, wherein the space defines first and second ends, wherein the pivotable light beam emitter is located toward the first end of the space and emits the light beam across the space from the first end of the space toward the second end of the space.

3. An object detection arrangement for a mobile storage system including at least one movable storage unit movable across a space, wherein the movable storage unit includes a drive arrangement, comprising:
    a first pivotable light beam emitter located toward a first side of the space, wherein pivoting movement of the first light beam emitter functions to move a first light beam in a direction across the space toward a second side of the space;
    a first reflector arrangement located toward the second side of the space opposite the first light beam emitter, wherein the first reflector arrangement reflects the first light beam from the second side of the space toward the first side of the space;
    a first sensor located toward the first side of the space for sensing the first light beam reflected by the first reflector arrangement;
    a second pivotable light beam emitter located toward the second side of the space, wherein pivoting movement of the second light beam emitter functions to move a second light beam in a direction across the space toward the first side of the space;

a second reflector arrangement located toward the first side of the space opposite the second light beam emitter, wherein the second reflector arrangement reflects the second light beam from the second light beam emitter from the first side of the space toward the second side of the space; and a second sensor located toward the second side of the space for sensing the second light beam reflected by the second reflector arrangement;

wherein the presence of an object within the space functions to obstruct passage of at least one of the first and second light beams through the space such that the light beam is prevented from reaching the reflector arrangement located toward the opposite side of the space.

4. The object detection arrangement of claim 3, wherein the first-mentioned and second reflector arrangements each comprise a series of spaced-apart reflector members, wherein each reflector member functions to reflect the light beams in a pulse-type manner.

5. The object detection arrangement of claim 3, wherein at least one of the first-mentioned and second light beam emitters is mounted to and movable with one of the movable storage units.

6. The object detection arrangement of claim 5, wherein the space is defined between a pair of movable storage units, wherein the first-mentioned emitter is mounted toward an end of a first one of the movable storage units and wherein the second emitter is mounted toward an opposite end of a second one of the movable storage units.

7. The object detection arrangement of claim 2, wherein the sensor is located adjacent the pivotable light beam emitter.

8. An object detection arrangement for a mobile storage system including at least one movable storage unit movable across a space, wherein the movable storage unit includes a drive arrangement, wherein the space defines first and second ends, comprising:

a first pivotable light beam emitter located toward a first end of the space, wherein pivoting movement of the first light beam emitter functions to move a first light beam in a direction across the space from the first end of the space toward the second end of the space;

a first reflector arrangement located toward the second end of the space opposite the first light beam emitter, wherein the first reflector arrangement reflects the first light beam from the second end of the space toward the first end of the space;

a first sensor located toward the first end of the space for sensing the first light beam reflected by the first reflector arrangement, wherein the first sensor is located adjacent the first pivotable light beam emitter;

a second light beam emitter, wherein the second light beam emitter is located toward the second end of the space and emits a second light beam across the space from the second end of the space toward the first end of the space;

a second reflector arrangement located toward the first end of the space; and a second sensor located adjacent the second light beam emitter;

wherein the presence of an object within the space functions to obstruct passage of at least one of the first and second light beams through the space such that the light beam is prevented from reaching the reflector arrangement located toward the opposite side of the space.

9. The object detection arrangement of claim 8, further comprising a first light beam receiver located adjacent the first pivotable light beam emitter for receiving the light beam from the second pivotable light beam emitter to provide an indication that the light beam from the second light beam emitter has reached the first end of the space, and a second light beam receiver located adjacent the second light beam emitter for receiving the light beam from the first light beam emitter to provide an indication that the first light beam has reached the second end of the space.

10. The object detection arrangement of claim 9, wherein each pivotable light beam emitter, sensor and light beam receiver is mounted within a housing arrangement.

11. The object detection arrangement of claim 10, wherein each pivotable light beam emitter comprises a light beam generator pivotably mounted within the housing arrangement, wherein the housing arrangement includes a window allowing the light beam from the light beam emitter to pass outwardly of the housing arrangement, and a motor disposed within the housing arrangement and interconnected with the light beam generator for imparting pivoting movement to the light beam generator.

12. The object detection arrangement of claim 10, further comprising a positioning arrangement associated with each housing arrangement for adjusting the position of the light beam emitted by the light beam emitter mounted within the housing arrangement.

13. The object detection arrangement of claim 3, wherein the first and second sensors are interconnected with the drive arrangement of the movable storage unit for preventing operation of the drive arrangement and movement of the movable storage unit in response to detection of the presence of an object within the space.

14. A method of detecting the presence of an object in a space, wherein the space defines at least one open end, comprising the steps of:

positioning a light beam emitter at a first location outwardly of the space and at a location inwardly of the open end of the space;

rotating the light beam emitter to move the light beam in a generally horizontal plane across the space such that the light beam traverses at least a portion of the space from a location inwardly of the open end of the space toward the open end of the space, wherein the step of rotating the light beam emitter is carried out such that the light beam is not moved into the open end of the space; and sensing the passage of the light beam across the space, wherein the presence of an object within the space obstructs the passage of the light beam across the space such that the failure of the light beam to pass across the space indicates the presence of an object within the space.

15. The method of claim 14, wherein the space defines first and second sides, wherein at least one of the first and second sides is defined by a movable storage unit, and further comprising the step of preventing movement of the movable storage unit in response to detection of the presence of an object within the space.

16. A method of detecting the presence of an object in a space, comprising the steps of:

positioning a light beam emitter at a first location outwardly of the space;

rotating the light beam emitter to move the light beam across the space such that the light beam traverses at least a portion of the space;

sensing the passage of the light beam across the space, wherein the presence of an object within the space obstructs the passage of the light beam across the space such that the failure of the light beam to pass across the space indicates the presence of an object within the space, wherein the space defines first and second sides, wherein at least one of the first and second sides is defined by a movable storage unit, and wherein the light beam emitter is located outwardly of the first side of the space;

positioning a second light beam emitter outwardly of the second side of the space; and preventing movement of the movable storage unit in response to detection of the presence of an object within the space.

17. The method of claim 16, wherein the step of positioning the first-mentioned and second light beam emitters includes mounting one of the light beam emitters to the movable storage unit.

18. The method of claim 16, wherein the step of sensing the passage of the light beam across the space is carried out by positioning a series of reflectors toward each of the first and second sides of the space and positioning a pair of receivers toward each of the first end sides of the space, wherein a first light beam emitted by the first-mentioned light beam emitter impinges upon the reflectors located toward the second side of the space which reflect the first light beam back toward the first side of the space, wherein the receiver located toward the first side of the space receives the light beam reflected by the reflectors located toward the second side of the space, and wherein a second light beam emitted by the second light beam emitter impinges upon the reflectors located toward the first side of the space which reflect the second light beam back toward the second side of the space, wherein the receiver located toward the second side of the space receives the light beam reflected by the reflectors located toward the first side of the space, and wherein the presence of an object within the space prevents the reflected light beams from reaching at least one of the receivers.

19. The method of claim 18, wherein the step of positioning the first-mentioned and second light beam emitters and positioning the pair of receivers is carried out by positioning each receiver adjacent one of the emitters.

20. The method of claim 19, wherein the step of positioning each light beam emitter and receiver located adjacent the emitter is carried out by pivotably mounting a combination emitter/receiver unit, and wherein the step of rotating the light beam emitter is carried out by selectively imparting rotation to the pivotable combination emitter/receiver unit.

21. The method of claim 20, wherein each emitter/receiver unit is pivotably mounted within a housing, wherein each emitter/receiver unit is interconnected with the output of a motor such that operation of the motor imparts rotation to the combination emitter/receiver unit.

22. The method of claim 20, wherein one of the combination emitter/receiver units is mounted to and movable with the movable storage unit.

23. An object detection system for use in connection with a movable member located adjacent a space, comprising:

a pair of pivotable emitters, wherein a first one of the emitters is located toward a first side of the space and a second one of the emitters is located toward a second side of the space, wherein each emitter emits a light beam which moves across and through the space upon pivoting movement of the emitter;

a first series of spaced reflectors located toward the first side of the space;

a second series of spaced reflectors located toward the second side of the space;

a first receiver located toward the first side of the space; and a second receiver located toward the second side of the space;

wherein light from the first emitter is reflected by the second series of reflectors and is received by the first receiver, and wherein light from the second emitter is reflected by the first series of reflectors and is received by the second receiver, wherein the presence of an object within the space blocks the path of light from at least one of the first reflectors to the second receiver or from at least one of the second reflectors to the first receiver, to provide an indication as to the presence of an object within the space.

24. The object detection system of claim 23, wherein the movable member includes a drive arrangement for moving the movable member within the space, and further comprising a control arrangement interconnected with the drive arrangement and the first and second receivers for preventing operation of the drive arrangement in response to detection of the presence of an object within the space.

25. The object detection system of claim 24, wherein the space is defined between a pair of movable members, each of which is movable within the space toward the other in response to operation of a drive arrangement, and wherein the control arrangement is interconnected with the drive arrangement of each movable member for preventing operation of each drive arrangement in response to detection of the presence of an object within the space.

26. The object detection system of claim 23, wherein the first pivotable emitter and the first receiver are mounted to the movable member.

27. The object detection system of claim 26, wherein the space is defined between a pair of movable members, wherein the first pivotable emitter and the first receiver are mounted to a first one of the pair of movable members and wherein the second pivotable emitter and the second receiver are mounted to a second one of the pair of movable members, wherein the first series of spaced reflectors are mounted to the second movable member and the second series of spaced reflectors are mounted to the first movable member.

28. The object detection system of claim 23, wherein the first pivotable emitter and the first receiver are located adjacent each other and the second pivotable emitter and the second receiver are located adjacent each other.

29. The object detection system of claim 28, wherein the first pivotable emitter and the first receiver are located within a first housing, and wherein the second pivotable emitter and the second receiver are located within a second housing.

30. The object detection system of claim 29, wherein the first housing includes a third receiver for receiving the light beam from the second pivotable emitter and the second housing includes a fourth receiver for receiving the light beam from the first pivotable emitter, wherein the third and fourth receivers are interconnected with a control arrangement for providing an indication to the first and second emitters to control the range of travel of the light beams from the first and second emitters.

31. An object detection system for use in connection with an upright movable member located adjacent an open-ended space, comprising:

at least one emitter located toward a first side of the space, wherein the emitter emits a light beam and is movable so as to move the light beam in a generally horizontal plane across and through the space without moving the light beam into the open end of the space;

at least one receiver located toward a second side of the space, wherein the at least one receiver receives the light beam from the emitter and wherein the presence of an object within the space functions to block the light beam to prevent the light beam from reaching the receiver, to indicate the presence of an object within the space.

32. An object detection system for use in connection with a movable member located adjacent a space, comprising:

at least one emitter located toward a first side of the space, wherein the at least one emitter emits a light beam and is movable so as to move the light beam across and through the space;

at least one receiver located toward a second side of the space, wherein the at least one receiver receives the light beam from the at least one emitter, wherein the space extends between a first end and a second end, wherein a first emitter is located at a first end of the space and emits a first light beam across the space in a first direction, and wherein a second emitter is located at a second end of the space and emits a second light beam across the space in a second direction opposite the first direction;

wherein the presence of an object within the space functions to block at least one of the light beams to prevent the light beam from reaching the receiver, to indicate the presence of an object within the space.

33. The object detection system of claim 32, wherein a first receiver is located toward the first side of the space and a second receiver is located toward the second side of the space.

34. The object detection system of claim 33, further comprising a first series of reflectors located toward the first side of the space and a second series of reflectors located toward the second side of the space, wherein the first light beam from the first emitter is reflected by the second series of reflectors back toward the first emitter, and wherein the second light beam from the second emitter is reflected by the first series of reflectors back toward the second emitter.

35. The object detection system of claim 34, wherein the first emitter and the first receiver are located adjacent each other and the second emitter and the second receiver are located adjacent each other, wherein the first light beam from the first emitter is received by the second receiver, and wherein the second light beam from the second emitter is received by the first receiver.

36. An object detection system for use in connection with an upright movable member located adjacent a space, wherein the space defines an open end, comprising:

at least one emitter located toward a first side of the space, wherein the emitter emits a light beam and is configured so as to be movable so as to move the light beam in a generally horizontal plane across the space toward a second side of the space without movement into the open end of the space;

a series of reflectors located toward the second side of the space, wherein the light beam from the emitter impinges upon the reflectors as the emitter moves so as to reflect the light beam from the second side of the space back toward the first side of the space; and a receiver located toward the first side of the space, wherein the receiver receives the light beam reflected by the reflectors and wherein the presence of an object within the space functions to block the path of light between the emitter and the receiver.

37. An object detection system for use in connection with a movable member located adjacent a space, comprising:

at least one emitter located toward a first side of the space, wherein the at least one emitter emits a light beam and is movable so as to move the light beam across the space toward a second side of the space;

a first series of reflectors located toward the second side of the space, wherein the light beam from a first emitter impinges upon the first series of reflectors as the first emitter moves so as to reflect the light beam from the second side of the space back toward the first side of the space;

a first receiver located toward the first side of the space, wherein the first receiver receives the light beam reflected by the first series of reflectors;

a second emitter located toward the second side of the space;

a second receiver located toward the second side of the space; and a second series of reflectors located toward the first side of the space, wherein the light beam from the second emitter impinges upon the second series of reflectors and is reflected back toward the second side of the space and is received by the second receiver wherein the presence of an object within the space functions to block the path of light between the at least one of the emitters and the associated receiver.

38. The object detection system of claim 37, wherein the first emitter and the first receiver are located adjacent each other and are movable together, and wherein the second emitter and the second receiver are located adjacent each other and are movable together.

39. The object detection system of claim 38, further comprising a stationary third receiver located adjacent the first emitter and the first receiver, and a stationary fourth receiver located adjacent the second emitter and the second receiver, wherein the third receiver receives the light beam from the second emitter and the fourth receiver receives the light beam from the first emitter, wherein the third and fourth emitters are interconnected with a control arrangement for controlling the range of movement of the light beams from the first and second emitters.

40. The storage system of claim 1, wherein the movable storage unit defines one side of a space that defines first and second open ends, wherein the wherein the light beam emitter is configured to pivot to a first position at which the light beam impinges on the reflector arrangement adjacent a first open end of the space, and to pivot to a second position at which the light beam impinges on the reflector arrangement adjacent a second open end of the space.

41. The storage system of claim 40, wherein the sensor interacts with the light beam emitter to determine the position of the light beam emitter and to control movement of the light beam emitter between the first and second positions.

* * * * *

UNITED STATES PATENT AND TRADEMARK OFFICE
CERTIFICATE OF CORRECTION

PATENT NO. : 6,707,028 B2
DATED : March 16, 2004
INVENTOR(S) : Robert A. Housh et al.

It is certified that error appears in the above-identified patent and that said Letters Patent is hereby corrected as shown below:

<u>Title page</u>,
Item [56], References Cited, U.S. PATENT DOCUMENTS, please add
-- 5,670,778   9/1997  Smith
   4,107,522   8/1978  Walter --.

<u>Column 16</u>,
Lines 26-27, after "space," there should not be a new paragraph and -- wherein the… -- should continue as the same paragraph.

Signed and Sealed this

Third Day of August, 2004

JON W. DUDAS
*Acting Director of the United States Patent and Trademark Office*